United States Patent [19]

Izumida

[11] Patent Number: 4,702,454
[45] Date of Patent: Oct. 27, 1987

[54] BUFFER DEVICE FOR USE TO THE SEATS OF VEHICLES

[75] Inventor: Satoshi Izumida, Koshigaya, Japan

[73] Assignee: Ikeda Bussan Co. Ltd., Kanagawa, Japan

[21] Appl. No.: 710,406

[22] Filed: Mar. 11, 1985

[30] Foreign Application Priority Data

Mar. 12, 1984 [JP] Japan .................................. 59-46680

[51] Int. Cl.⁴ ............................................. B60N 1/02
[52] U.S. Cl. ..................................... 248/585; 248/576
[58] Field of Search ............... 248/560, 562, 564, 565, 248/566, 575, 576, 580, 581, 584, 585, 586, 591–593, 595, 599, 157, 421; 297/307

[56] References Cited

U.S. PATENT DOCUMENTS 3,339,906 9/1967 Persson ................................. 248/585
3,807,680 4/1974 Wilson ................................. 248/421
3,897,036 7/1975 Nystrom ............................ 248/584
4,241,894 12/1980 Okuyama ........................... 248/593
4,448,386 5/1984 Moorhouse ....................... 248/564

FOREIGN PATENT DOCUMENTS 593514 3/1960 Canada ................................. 248/584
782871 4/1968 Canada ................................. 248/576
936249 11/1955 Fed. Rep. of Germany ...... 248/585
2059271 6/1972 Fed. Rep. of Germany ...... 248/585
873978 8/1961 United Kingdom .............. 248/575
2029208 3/1980 United Kingdom .............. 248/585

Primary Examiner—J. Franklin Foss
Assistant Examiner—Robert A. Olson
Attorney, Agent, or Firm—Schwartz, Jeffery, Schwaab, Mack, Blumenthal & Evans

[57] ABSTRACT

A buffer device for use to the seats of vehicles provided with a pair of links arranged parallel to each other between floor brackets and an upper frame of the seat to form a parallel linkage mechanism. The upper ends of the links are swingably attached to the upper shafts and a connector rod are supported by the upper shafts at both ends thereof, so that a second parallel linkage mechanism can be formed by the connector rod and a line passing through the centers of the upper shafts. The connector rod prevents the links from being inclined independently of the other when the links are inclined nearly horizontal, thereby enabling the device to be made stable when the links are nearly horizontal.

6 Claims, 3 Drawing Figures

BUFFER DEVICE FOR USE TO THE SEATS OF VEHICLES

BACKGROUND OF THE INVENTION

The present invention relates to a buffer device for use with the seats of vehicles and, more particularly, it relates to a buffer device for use with the seats of vehicles such as a car, forklift truck and tractor and provided with a parallel linkage mechanism.

When vehicles run on a rough road, upward and downward vibrations, shock and the like act on drivers and other persons in the vehicles. As a measure to prevent this, there has been well-known a buffer device wherein a parallel or X-type linkage mechanism is arranged between a seat and the floor and combined with buffer members and shock absorbers to buffer the shock and reduce vibrations.

In the case of the buffer device wherein the parallel linkage mechanism is employed, front and rear links are located parallel to each other between the seat and a floor bracket to hold the seat float from the floor bracket.

The response of the seat relative to such inertial force as shock and vibrations becomes better as the slope of the linkage mechanism becomes closer to horizontal in relation to a horizontal face made by the links.

The same thing can be said in the case of using the X-type linkage mechanism, but it is structually impossible in this case to bring the links to a horizontal state. Therefore, the use of the parallel linkage mechanism is more practical when the response of the seat relative to the inertial force is aimed at as a target.

As the front and rear links become more and more horizontal, however, the rotating path of the seat becomes accorded with that of each of the links, and one of the links sometimes moves under the horizontal line. The seat is rotated and inclined forward or backward in this case, thereby causing the possibility of bringing the person, who is seated on the seat, into danger.

SUMMARY OF THE INVENTION

The present invention is characterized by front and rear links arranged parallel to each other between a floor bracket and an upper frame of a seat to form a parallel linkage mechanism, a pair of upper shafts for rotatably attaching the upper ends of the links to the upper frame, a pair of brackets erected from the upper portions of the upper shafts, a connector rod supported by the brackets at both ends thereof and cooperating with a line which combines the centers of the upper shafts to form a second linkage mechanism, hooks projected above the upper shafts, and buffer members each engaged with the hook and upper frame at both ends thereof.

The present invention therefore enables the connector rod to prevent the links from being inclined independently of each other, when these front and rear links are inclined nearly horizontal. Accordingly, the links can be made stable when they are nearly horizontal, thereby eliminating the drawback of the conventional buffer device in which the parallel linkage mechanism was employed.

An object of the present invention is therefore to provide a buffer device for use with the seats of vehicles wherein the operational effect of the buffer members is enhanced by putting the slope of each of the links, which form the parallel linkage mechanism, nearly horizontal to thereby make the seats excellently responsive to any inertial forces, large and small.

Another object of the present invention is to provide a buffer device for use with the seats of vehicles capable of preventing the front and rear links from being reversed, and also capable of making the forward and backward movements and slopes of the seat small at the same stroke.

A further object of the present invention is to provide a buffer device for use with the seats of vehicles which can be made low as a whole.

A still further object of the present invention is to provide a buffer device for use with the seats of vehicles capable of holding the seat stable, and excellent on cushioning capacity and safety.

These and other objects as well as merits of the present invention will become apparent from the following description of the drawings.

DETAILED DESCRIPTION OF THE PREFERRED EMBODIMENT

Figure 1:
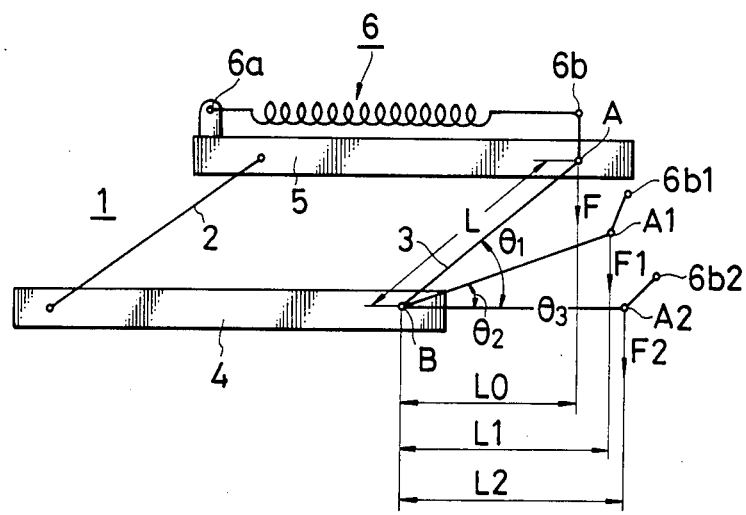
FIG. 1 shows a buffer device provided with a parallel linkage mechanism, from which the present invention is originated.

In FIG. 1, a parallel linkage mechanism 1 comprises a front link 2, a rear link 3, an upper frame 5 located under a seat (not shown) and pivoted on the upper ends of said front and rear links 2 and 3, and a floor bracket 4 attached to the lower end of each of the links 2 and 3 and supporting them.

Both ends 6a and 6b of a buffer member 6 are attached to the upper frame 5 and a portion of the rear link 3 which projects from its center of rotation A on the upper frame 5, respectively.

In the case where the inclined angles of the front and rear links 2 and 3 are $\theta 3$(horizontal, the rotation center A is positioned at A2, and buffer end 6b is at 6b2, $\theta 2$(the rotation center is positioned at A1, and buffer end 6b is at 6b1), and $\theta 1$ (the components are arranged as described above), the angular moment M of a rotation center B of the rear link 3 on the floor bracket 4 can be expressed as follows, provided that force F(F=F1=F2 in FIG. 1) which is added to the rear link 3 be certain:

$$M = FL \cos\theta 1 < F1 \cdot L \cos\theta 2 < F2 \cdot L \cos\theta 3$$
$$= F \cdot L0 < F \cdot L1 < F \cdot L2$$

In other words, the angular moment M becomes larger as the slope of the rear link 3 becomes more horizontal, and the buffer member 6 provides a higher pulling force to enhance the response of the seat as the front and rear links 2 and 3 become more and more horizontal.

When the front and rear links 2 and 3 become nearly horizontal, however, the loci of the front and rear links 2, 3 and upper frame 5 geometically trace to keep the interval between them certain. As a result, it is likely to happen that one of the front and rear links 2 and 3 swings under the horizontal line to incline the upper frame 5.

Figure 2:
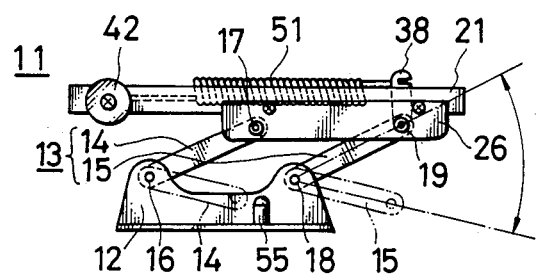
FIG. 2 is a side view showing an example of the buffer device according to the present invention.
Figure 3:
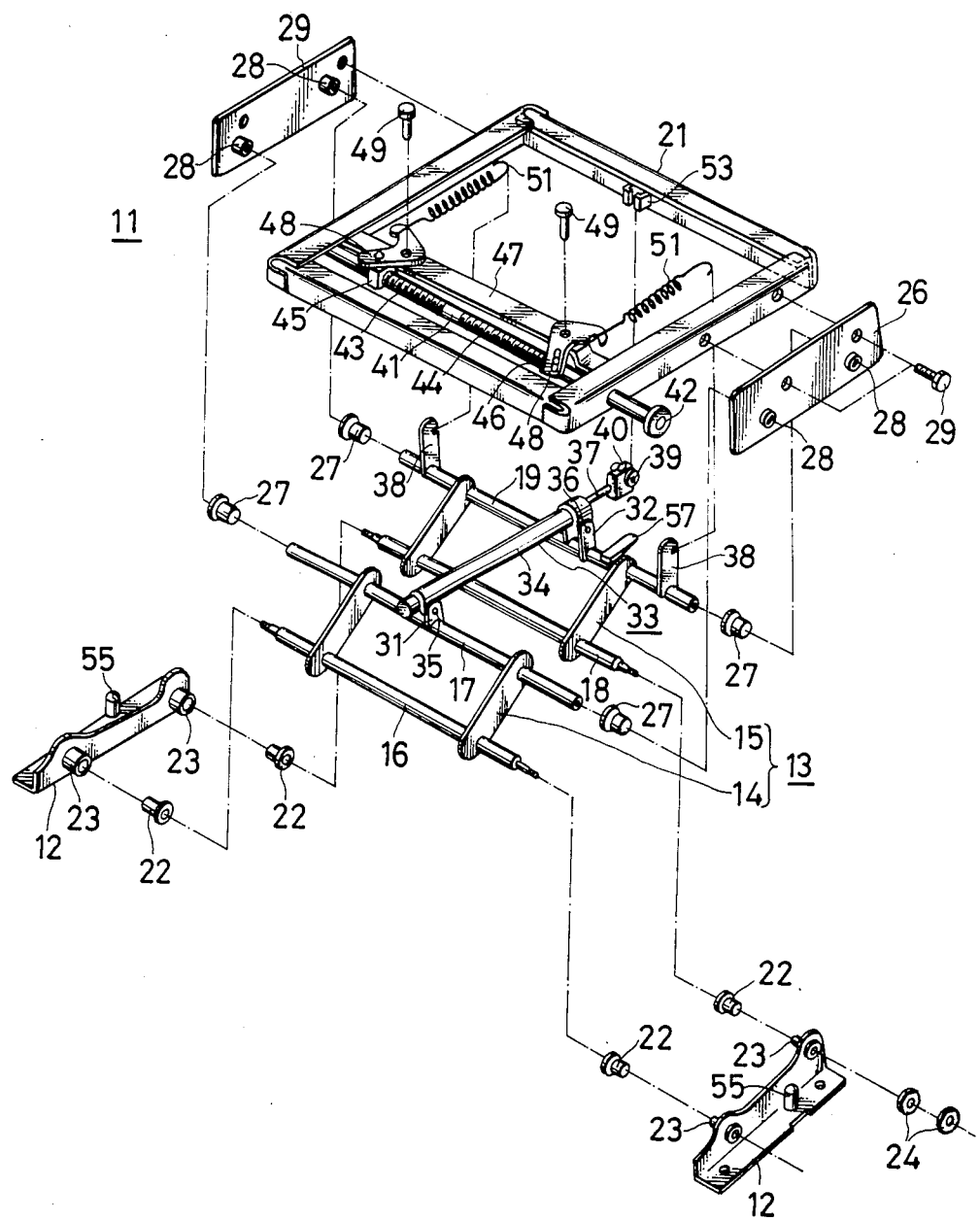
FIG. 3 is a perspective view showing the buffer device of the present invention dismantled.

This is the matter to be solved by the preferred embodiments of the present invention shown in FIGS. 2 and 3.

A buffer device 11 has a parallel linkage mechanism 13 between a pair of floor brackets 12 and an upper frame 21 located on the side of a seat cushion. The parallel linkage mechanism 13 has a pair of front and rear links 14 and 15.

A lower shaft 16 is passed through the lower end of each of the front links 14 and fixed thereto, while an upper shaft 17 is passed through the upper end thereof and fixed thereto.

Similarly, a lower shaft 18 is passed through the lower end of each of the rear links 15 and fixed thereto, while the upper shaft 19 is passed through the upper end thereof and fixed thereto.

Both ends of the lower shafts 16 and 18 are attached to floor brackets 12, respectively, through inner and outer bushes 22 and 23.

The inner bush 22 is made of plastic such as nylon and polyacetal, while the outer bush 23 is of metal. Those ends of the lower shafts 16 and 18 which are projected from the floor brackets 12 are fixed by means of nuts 24, and the lower shafts 16 and 18 are rotatably supported between the floor brackets 12.

Hinge brackets 26 are attached to both sides of the upper frame 21 by means of bolts 29. Bushes 28 are fixed at the front and rear of the hinge bracket 26.

Both ends of each of the upper shafts 17 and 19 are attached into bushes 28 through inner bushes 27. The inner bush 27 is made of same material as that of the bush 22, while the bush 28 is of metal similarly to the case of the outer bush 23.

The front and rear of a cylinder 34 which serves as a connector rod to form a shock absorber 33 are fixed to the upper shafts 17 and 19. The cylinder 34 is fixed in such a manner that brackets 31 and 32 are fixed to the upper shafts 17 and 19, respectively, and that the front and rear of the cylinder 34 are fixed to the brackets 31 and 32, respectively, by means of pins 35 and 36. The cylinder 34, bracket 26 and a line which passes through centers of the upper shafts 17 and 19 trace a parallelogram, when viewed from the side thereof, to form a second parallel linkage mechanism.

A plunger 37 projects rearward from the rear of the cylinder 34. Rollers 39 are supported by a roller bracket 40 at the rear end of the plunger 37. The rollers 39 are guided up and down by a guide member 53 formed at the rear side of the upper frame 21.

A pair of hooks 38 are fixed to both ends of the upper shaft 19 of the rear links 15, respectively. The hook 38 has an adequate angle relative to the longitudinal direction of the rear link 15 to project upward even when the rear link 15 become substantially horizontal.

A screw shaft 41 is arranged between both sides of the upper frame 21. One end of this screw shaft 41 passes through and projects outside one side of the upper frame 21, and an operation knob 42 is fixed to this projected end of the screw shaft 41.

Threaded portions 43 and 44 symmetrical to each other are formed at both ends of the screw shaft 41, and movable members 45 and 46 are screwed onto the threaded portioned 43 and 44, respectively, so that the movable members 45 and 46 can be moved symmetrically to each other by the rotation of the screw shaft 41.

A belt-like plate 47 is fixed to the upper frame 21 along the screw shaft 41, and a pair of bell-crank-like levers 48 are rotatably attached to the plate 47 by means of pins 49. One end of each of the levers 48 is engaged with each of the movable members 45 and 46 which are screwed onto the screw shaft 41. Slots are formed on the portions of each of the levers 48 corresponding to the movable members 45 and 46 as shown in FIG. 3. Pins are extended upward from the movable members 45 and 46, and each of the pins engages each of the slots.

One end of each of paired buffer members 51 which are springs or the like is attached to the other ends of each of the levers 48, while the other end thereof is attached to each other of the hooks 38 which are fixed to the upper shaft 19.

When the screw shaft 41 is rotated by the operation knob 42 and the movable members 45 and 46 are moved to approach each other or separate from each other, each of the levers 48 is swung around the pin 49 by the other pin engaged in the slot to thereby adjust the tension of the buffer member 51.

A bumper rubber 55 made of rubber or the like is erected on each of the floor bracket 12 to serve as an auxiliary buffer member when the upper frame 21 is lowered quickly. A stopper bracket 57 is attached to the upper shaft 19 of the rear links 15, extending in the transverse direction, to strike a part of the upper frame 21 so as to limit the lift of the upper shaft 19 at an adequate height.

When a person sits down on the seat cushion to load the upper frame 21, the front and rear links 14 and 15 are swung downward because the upper shafts 17 and 19 are swung around the lower shafts 16 and 18 against the tension of the buffer member 51.

Even when the buffer member 51 is vibrated this time, the rollers 39 of the plunger 37 are caused only to move up and down along the guide member 53 because the brackets 31 and 32 are swung together with the upper shafts 17 and 19 and the interval between the rear end of the cylinder 34 of the shock absorber 33 and the guide member 53 on the rear side of the upper frame 21 is thus changed. The shock absorber 33 thus achieves an attenuation effect to stop the vibration.

Since a line which joins the centers of the upper shafts 17 and 19 and another line which joins the pins 35 and 36 from a second linkage mechanism which is a parallelogram when viewed from the side thereof, the rear or front links 15 or 14 would never be swung reversely.

According to the above-described embodiment of the present invention, the second linkage mechanism has been formed by the lines passing through the centers of the upper shafts 17, 19 and crossing the pins 35, 36 of the shock absorber 33 which serves as the connector rod, but it may be formed by a connector rod or the like which is arranged differently and the line passing through the centers of the upper shafts 17, 19.

When the upper frame 21 is formed as a seat cushion frame, a higher quality seat, lighter and thinner, will be available.

Although the present invention has been described referring to a preferred embodiment, it should be understood that various changes and modifications are made without departing from the spirit and scope of the present invention.

What is claimed is:

1. A buffer device for use with the seats of vehicles comprising:
   a pair of floor brackets;
   an upper frame disposed above said floor brackets;

front and rear links arranged parallel between said floor brackets and said upper frame to form a first parallel linkage mechanism for supporting said upper frame;

a pair of upper shafts extending between each link and swingably connecting an upper end of the front and rear links to said upper frame;

a pair of upper brackets on each of said upper shafts;

a connector rod both ends of which are supported by the upper brackets to form a second parallel linkage mechanism together with a line which passes between the upper shafts;

hooks projected upward from one of said upper shafts;

buffer members bridged between the hooks and the upper frame;

said connector rod comprising a cylinder member having a pair of ends, both ends of which are supported by said pair of brackets, said cylinder member having a plunger which strokes in the longitudinal direction; and the plunger projecting through the cylinder member is connected, slidable up and down, to a guide member on a rear side of the upper frame.

2. A buffer device for use with the seats of vehicles according to claim 1 wherein said hooks are erected on the upper shaft located on the rear side, and said buffer members are bridged between the front side of the upper frame and the hooks.

3. A buffer device for use with the seats of vehicles according to claim 2 wherein said buffer members are tension coil springs.

4. A buffer device for use with the seats of vehicles according to claim 2 wherein a spring tension adjusting means is arranged on the side of the upper frame.

5. A buffer device for use with the seats of vehicles according to claim 4 wherein said spring tension adjusting means comprises a screw swingably supported by the upper frame, movable members moved by the screws, and levers each contacted with the movable member at one end thereof and swung by the latter and connected to the tension coil spring at the other end thereof.

6. A buffer device for use with the seats of vehicles according to claim 5 wherein a spring tension adjusting knob is attached to that end of said screw which projects from the side of said upper frame.

* * * * *